United States Patent
Van Der Mee et al.

(10) Patent No.: US 11,572,468 B2
(45) Date of Patent: Feb. 7, 2023

(54) WEATHERABLE TRANSPARENT HIGH HEAT POLYCARBONATE COPOLYMER COMPOSITION

(71) Applicant: SABIC GLOBAL TECHNOLOGIES B.V., Bergen op Zoom (NL)

(72) Inventors: Mark Adrianus Johannes Van Der Mee, Breda (NL); Roland Sebastian Assink, Middelburg (NL); Hendrikus Petrus Cornelis Van Heerbeek, Bergen op Zoom (NL)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 747 days.

(21) Appl. No.: 16/665,580

(22) Filed: Oct. 28, 2019

(65) Prior Publication Data
US 2020/0131362 A1    Apr. 30, 2020

(30) Foreign Application Priority Data

Oct. 29, 2018    (EP) .................................... 18203108

(51) Int. Cl.
| | |
|---|---|
| *C08L 69/00* | (2006.01) |
| *G02B 1/111* | (2015.01) |
| *G02B 1/14* | (2015.01) |
| *C08K 5/00* | (2006.01) |
| *C08K 5/42* | (2006.01) |
| *C08K 5/521* | (2006.01) |
| *C08K 5/524* | (2006.01) |

(52) U.S. Cl.
CPC ............ *C08L 69/005* (2013.01); *G02B 1/111* (2013.01); *G02B 1/14* (2015.01); *C08K 5/005* (2013.01); *C08K 5/42* (2013.01); *C08K 5/521* (2013.01); *C08K 5/524* (2013.01)

(58) Field of Classification Search
CPC ....... C08K 5/005; C08L 69/005; C08L 69/00; C08L 5/00; C08L 79/08; C08L 81/00; C08L 2205/02; C08L 2205/025; G02B 1/14; G02B 1/111; C09K 21/14
See application file for complete search history.

(56) References Cited

U.S. PATENT DOCUMENTS

| | | | |
|---|---|---|---|
| 6,759,504 B1 | 7/2004 | Mestanza | |
| 7,700,696 B2 | 4/2010 | Van De Grampel et al. | |
| 8,525,191 B2 | 9/2013 | Zhou et al. | |
| 9,051,463 B2 | 6/2015 | Uno et al. | |
| 9,365,720 B2 * | 6/2016 | van der Mee | ........... C08K 7/14 |
| 10,005,902 B2 * | 6/2018 | Sybert | ..................... C25D 11/02 |
| 10,017,641 B2 * | 7/2018 | Sybert | ..................... B32B 27/08 |
| 2008/0161507 A1 | 7/2008 | Chakravarti et al. | |
| 2009/0088504 A1 * | 4/2009 | Chatterjee | ............... C08L 69/00 |
| | | | 524/158 |
| 2012/0157653 A1 | 6/2012 | Konig et al. | |
| 2013/0224462 A1 * | 8/2013 | van der Mee | ......... C09K 21/14 |
| | | | 428/220 |
| 2013/0317142 A1 | 11/2013 | Chen et al. | |
| 2014/0179843 A1 * | 6/2014 | van der Mee | ........ C08L 51/085 |
| | | | 525/461 |
| 2020/0131362 A1 * | 4/2020 | van der Mee | ........... C08L 69/00 |

FOREIGN PATENT DOCUMENTS

| | | | | |
|---|---|---|---|---|
| CN | 106009555 A | | 10/2016 | |
| EP | 2097482 B1 | | 9/2009 | |
| EP | 2097482 B1 * | | 9/2010 | ............. C08L 67/00 |
| WO | 2008013579 A2 | | 1/2008 | |
| WO | 2015044912 A1 | | 4/2015 | |
| WO | 2016016850 A1 | | 2/2016 | |
| WO | 2017203495 A1 | | 11/2017 | |
| WO | WO-2017203495 A1 * | | 11/2017 | ............. C08G 64/12 |

OTHER PUBLICATIONS

European Search Report for European Application No. 18203108.8 dated May 16, 2019, 5 pages.

* cited by examiner

*Primary Examiner* — Robert D Harlan
(74) *Attorney, Agent, or Firm* — Cantor Colburn LLP

(57) ABSTRACT

A thermoplastic composition comprising: a copolycarbonate comprising bisphenol A (BPA) carbonate units and 10-50 mol % of second carbonate units different from the BPA carbonate units; a poly(carbonate-arylate ester) copolymer comprising BPA carbonate units and 5-50 mol % of mono-aryl arylate ester units; and optionally a BPA homopolycarbonate; wherein the thermoplastic composition has at least one of: a Vicat B120 softening temperature of 155° C. or greater; or a yellowness index of less than 10 on a plaque having a thickness of 3 mm and molded at a temperature of 360° C. for 5 minutes; or an increase in yellowness index of less than 5 after 600 hours of weathering per ISO 11341 on a molded plaque having a thickness of 1 mm.

20 Claims, No Drawings

WEATHERABLE TRANSPARENT HIGH HEAT POLYCARBONATE COPOLYMER COMPOSITION

CROSS REFERENCE TO RELATED APPLICATION

This application claims the benefit of priority to European Patent Application No. 18203108.8 filed Oct. 29, 2018, which is hereby incorporated by reference in its entirety.

BACKGROUND

This disclosure generally relates to polycarbonate compositions, and more particularly, to high heat copolycarbonate compositions having enhanced optical properties, methods of manufacture, and uses thereof.

Polycarbonates are useful in the manufacture of articles and components for a wide range of applications, from automotive parts to electronic devices. Because of their broad use, particularly in lenses, optical films, and healthcare products requiring high heat sterilization, it is desirable to provide polycarbonates with high heat performance combined with good optical properties, particularly after processing and after exposure to real life conditions such as prolonged exposure to high temperatures, humidity, and sun light.

Some known "high heat" copolycarbonates can have high glass transition temperatures of 150° C. or higher. But such polycarbonates are typically more yellow after processing and have lower transmission values. There accordingly remains a need for polycarbonate compositions having improved balance of high heat performance and optical properties.

SUMMARY

In an aspect, a thermoplastic composition comprises a copolycarbonate comprising bisphenol A carbonate units and second carbonate units different from the bisphenol A carbonate units, wherein the second carbonate units are present in an amount of 10-50 mole percent (mol %), preferably 20-45 mol %, more preferably 25-35 mol %, based on a sum of moles of bisphenol A carbonate units and second carbonate units; a poly(carbonate-arylate ester) copolymer comprising bisphenol A carbonate units and monoaryl arylate ester units, wherein the monoaryl arylate ester units are present in an amount of 5-50 mol %, preferably 10-30 mol %, based on the sum of moles of bisphenol A carbonate units and monoaryl arylate ester units; and optionally a bisphenol A homopolycarbonate; wherein the thermoplastic composition has a Vicat B120 softening temperature of 155° C. or greater, as measured according to ISO 306; and a yellowness index of less than 10, preferably less than 8, more preferably less than 6, as measured according to ASTM D1925 on a plaque having a thickness of 3 millimeters (mm) and molded at a temperature of 360° C. for a residence time of 5 minutes; and an increase in yellowness index of less than 5, or of less than 4, after 600 hours of weathering in accordance with ISO 11341 on a molded plaque having a thickness of 1 mm.

In another aspect, an article manufactured from the thermoplastic composition is provided, preferably wherein the article is a component of a device comprising a lens, a device comprising a light guide, a device comprising a waveguide, a device comprising a collimator, a device comprising an optical fiber, a device comprising a lighting element, a device comprising a window, or a device comprising a door; or a structural component of a vehicle, a building, or an appliance; more preferably wherein the article is a component of a medical device, a component of a display screen, a component of an electronic device, a component of a safety device, a component of a screen, a component of a conveyor, a component of a mold, a component of a dish, a component of an enclosure, a component of a packaging, a component of a gas barrier, a lens for automotive lighting, a film or a layer of a multi-layer film, or a lighting cover; even more preferably wherein the article has no significant part distortion or discoloration when subjected to a secondary operation comprising over-molding, lead-free soldering, wave soldering, low temperature soldering, coating with a high-temperature cure, or a combination thereof.

In still another aspect, an optical lens manufactured from the thermoplastic composition is provided, wherein the optical lens is a camera lens, a sensor lens, an illumination lens, a safety glass lens, an ophthalmic corrective lens, or an imaging lens; preferably wherein the optical lens is a table camera lens, a security camera lens, a mobile phone camera lens, a tablet camera lens, a laptop camera lens, a security camera lens, a camera sensor lens, a vehicle camera lens, a motion detector lens, a proximity sensor lens, a gesture control lens, an infrared sensor lens, an indoor lighting lens, an outdoor lighting lens, a vehicle headlamp lens, a vehicle foglight lens, a vehicle rearlight lens, a vehicle running light lens, a vehicle interior light lens, an a light emitting diode lens, an organic light emitting diode lens, an eyeglasses lens, a goggles lens, a visor, a helmet lens, a monocle lens, a corrective glasses lens, a contact lens, a scanner lens, a projector lens, a magnifying glass lens, a microscope lens, a telescope lens, a security lens, or a reading glasses lens; even more preferably wherein the optical lens further comprises an indicia or a coating disposed on at least a portion of one or both surfaces of the optical lens, preferably wherein the coating is a hard coat, a UV protective coat, an anti-refractive coat, an anti-reflective coat, a scratch resistant coat, or a combination thereof, or wherein at least a portion of a surface of the optical lens is metallized.

The above described and other features are exemplified by the following detailed description, examples, and claims.

DETAILED DESCRIPTION

Surprisingly, it has now been found that a thermoplastic composition comprising a phthalimidine copolycarbonate such as N-phenylphenolphthaleinyl bisphenol, 2,2-bis(4-hydro)-bisphenol A copolycarbonate ("PPPBP-BPA"), optionally a bisphenol A (BPA) homopolycarbonate, and a poly(carbonate-arylate ester) copolymer has desirable processibility, good mechanical properties, and excellent color retention. In particular, the thermoplastic composition has good initial color and transmission after molding under standard conditions, but also lower color change after molding at aggressive conditions. This would allow these compositions to be used in more demanding applications, for example tool designs requiring high melt temperatures to completely fill the tool. Furthermore, the compositions have excellent retention of optical properties, specifically color stability after exposure to high heat, hydro ageing (high moisture), and high ultraviolet (UV) conditions, which makes them suitable for use in articles that have demanding requirements for color stability during the lifetime of the article.

As used herein, phthalimidine copolycarbonates are high heat copolycarbonates having a glass transition temperature of 155° C. or higher, and comprising BPA carbonate units and second carbonate units of formula (1):

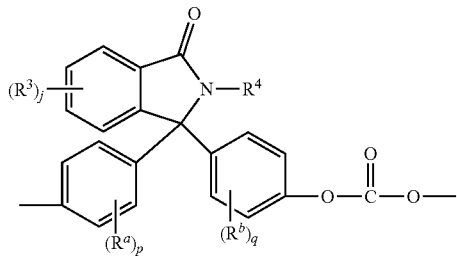

(1)

wherein $R^a$ and $R^b$ are each independently a $C_{1-12}$ alkyl, $C_{1-12}$ alkenyl, $C_{3-8}$ cycloalkyl, or $C_{1-12}$ alkoxy, preferably a $C_{1-3}$ alkyl, each $R^3$ is independently a $C_{1-6}$ alkyl, $R^4$ is hydrogen, $C_{1-6}$ or $C_{2-6}$ alkyl or phenyl optionally substituted with 1-5 $C_{1-6}$ alkyl groups, and p and q are each independently 0-4, preferably 0-1. For example, second carbonate units can be of formula (1a):

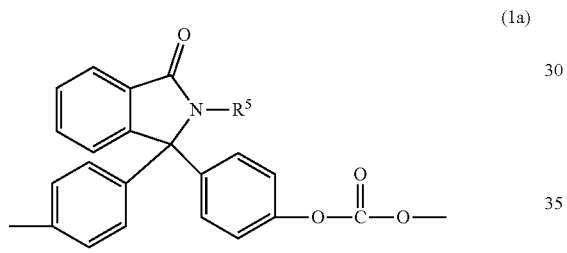

(1a)

wherein $R^5$ is hydrogen, phenyl optionally substituted with up to five $C_{1-6}$ alkyl groups, or $C_{1-4}$ alkyl, such as methyl or $C_{2-4}$ alkyl. In an aspect, $R^5$ is hydrogen or phenyl, preferably phenyl. Carbonate units (1a) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one or N-phenyl phenolphthalein or "PPPBP"). BPA carbonate units can be of formula (2):

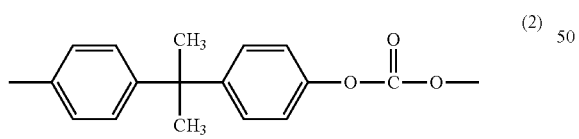

(2)

The copolycarbonate comprises 50-90 mole percent (mol %) of the BPA carbonate units and 10-50 mol % of the second carbonate units, preferably the copolycarbonate comprises 55-75 mol % of the BPA carbonate units and 20-45 mol %, more preferably 25-35 mol % of the second carbonate units, each based on a sum of moles of second carbonate units and BPA carbonate units.

In some aspects, the copolycarbonates further include third carbonate units different from BPA carbonate units and second carbonate units. The third carbonate units can be of formulas (3) to (7):

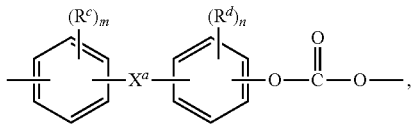

(3)

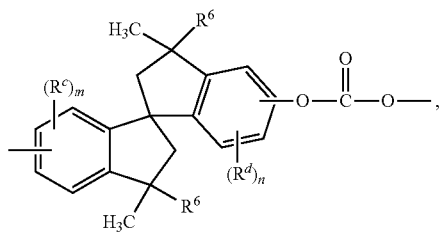

(4)

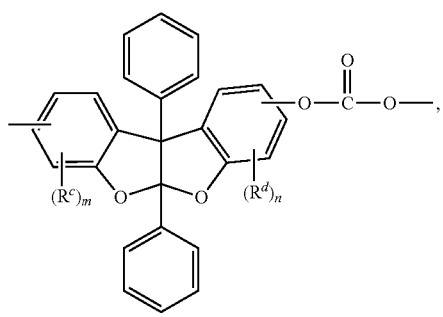

(5)

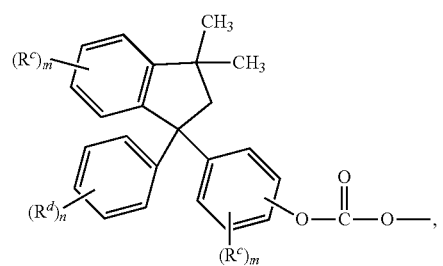

(6)

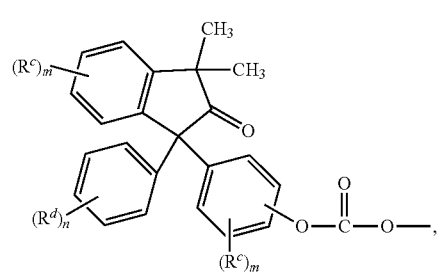

(7)

or a combination thereof, wherein $R^c$ and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, and y is 1, or $—C(P^1)(P^2)—$ wherein $P^1$ is $C_{1-12}$ alkyl and $P^2$ is $C_{6-12}$ aryl; and m and n are each independently 0-4.

Exemplary third carbonate units include the following

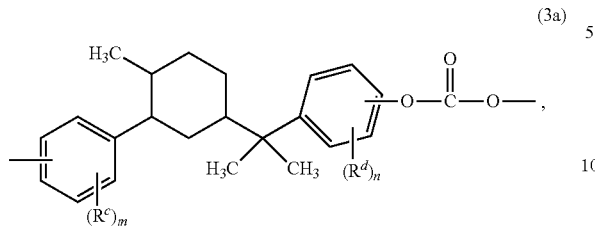
(3a)

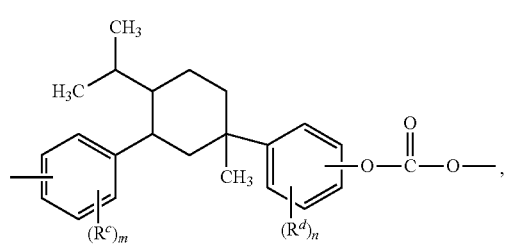
(3b)

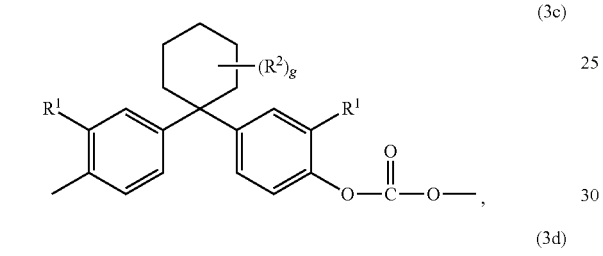
(3c)

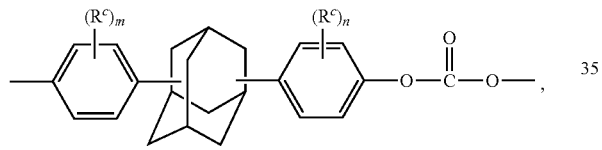
(3d)

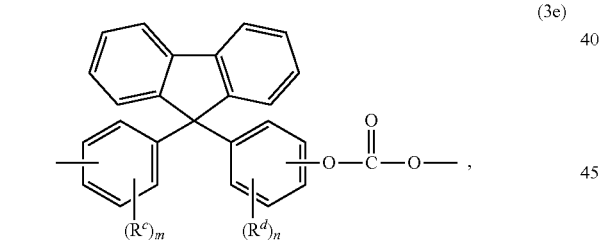
(3e)

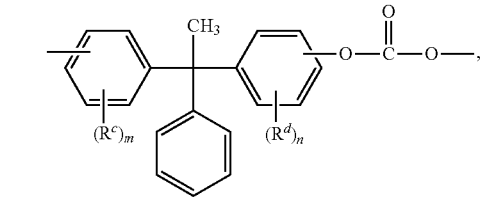
(3f)

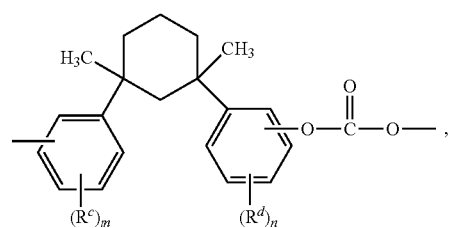
(3g)

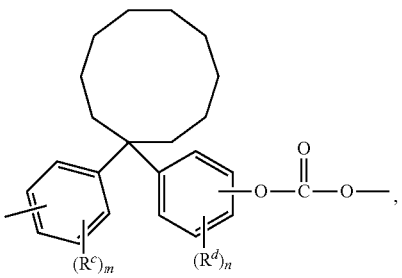
(3g)

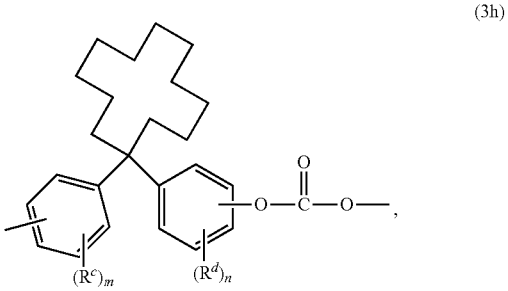
(3h)

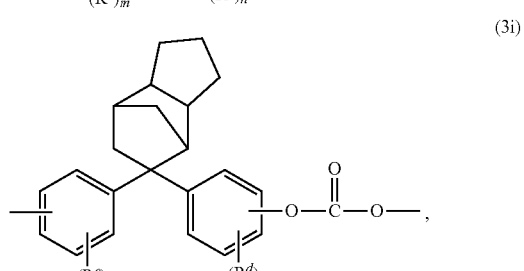
(3i)

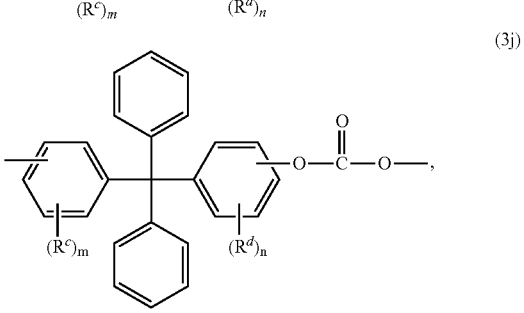
(3j)

or a combination thereof, wherein $R^c$ and $R^d$ are the same as defined herein for formulas (3) to (5), each $R^1$ is independently hydrogen or $C_{1-4}$ alkyl, each $R^2$ is independently $C_{1-4}$ alkyl, and g is 0-10. Preferably, each $R^1$ is independently hydrogen or methyl, each $R^2$ is independently methyl or hydrogen, g is 0-2, and m and n are 0. In a specific aspect the third carbonate units are 1,1-bis(4-hydroxyphenyl)-3,3,5-trimethyl-cyclohexane carbonate units, 1,1-bis(4-hydroxy-3-methylphenyl)cyclohexane, or a combination thereof. Preferably, the third carbonate units are 1,1-bis(4-hydroxyphenyl)-3,3,5-trimethyl-cyclohexane (BPA TMC) carbonate units.

When the third carbonate units are present, the copolycarbonates can comprise 25-70 mol % of the BPA carbonate units, 10-35 mol % of the second carbonate units, and 5-65 mol % of the third carbonate units, each based on the sum of moles of the BPA carbonate units, second carbonate units, and third carbonate units. Preferably, the copolycarbonates comprise 30-70 mol % of the BPA carbonate units, 10-35 mol % of the second carbonate units, 5-35 mol % of the third carbonate units, each based on the sum of the moles of the BPA carbonate units, second carbonate units, and third carbonate units.

The copolycarbonates can be highly random copolymers, which have less than 15 mol % or less than 10 mol % of the second carbonate units directly coupled to another second carbonate unit based on the total number of carbonate units in the copolycarbonates. The molar percent can be determined by nuclear magnetic resonance spectroscopy (NMR). Without wishing to be bound by theory, it is believed that by keeping the randomness of the high heat polymer, the properties of the high heat polymer remain consistent from batch to batch.

The copolycarbonates can have a weight average molecular weight (Mw) of 10,000-50,000 grams per mole (g/mol), preferably 16,000-30,000 g/mol, as measured by gel permeation chromatography (GPC), using a crosslinked styrene-divinylbenzene column and calibrated to BPA homopolycarbonate references. GPC samples are prepared at a concentration of 1 milligrams per milliliter (mg/mL) and are eluted at a flow rate of 1.5 mL per minute (mL/min).

The copolycarbonates can have a high glass transition temperature ($T_g$). The Tg of the high heat copolycarbonates is 155-280° C., more preferably 165-230° C., even more preferably 185-220° C., determined by differential scanning calorimetry (DSC) as per ASTM D3418 with a heating rate of 20° C. per min (° C./min).

The copolycarbonates can have high heat resistance. The heat deflection temperature (HDT) of the high heat copolycarbonates is 145-230° C., more preferably 155-240° C., even more preferably 175-230° C., measured flat on an 80×10×4 millimeter (mm) bar with a 64 mm span at 0.45 megapascal (MPa) according to ISO 75/Bf.

The copolycarbonates can have high Vicat softening temperature. In an aspect, the high heat copolycarbonates have a Vicat B120 of 150-245° C., preferably 160-235° C., even more preferably 180-225° C., measured according to ISO 306.

The copolycarbonates can be present in an amount of 10-85 wt %, 20-80 wt %, 30-70 wt %, or 40-70 wt % based on the total weight of the thermoplastic compositions.

The thermoplastic composition can optionally include a bisphenol A (BPA) homopolycarbonate. The BPA homopolycarbonate can be a linear BPA polycarbonate homopolymer having an Mw of 10,000-100,000 g/mol, or 15,000-50,000 g/mol, or 17,000-35,000 g/mol, as measured by gel permeation chromatography (GPC), using a crosslinked styrene-divinylbenzene column and calibrated to BPA homopolycarbonate references.

More than one BPA homopolycarbonate can be present. For example, the polycarbonate compositions can comprise a first BPA homopolycarbonate having an Mw of 20,000-25,000 g/mol and a second BPA homopolycarbonate having an Mw of 28,000-32,000 g/mol, or a second BPA homopolycarbonate having an Mw of 16,000-20,000 g/mol, each measured by GPC using BPA homopolycarbonate standards. The weight ratio of the first BPA homopolycarbonate relative to the second BPA homopolycarbonate can be, for example, 10:1-1:10, or 5:1-1:5, or 3:1-1:3 or 2:1-1:2.

The one or more BPA homopolycarbonates can be present in an amount of 0.1-60 wt %, preferably 0.3-50 wt %, 0.5-40 wt %, 0.5-30 wt %, or 0.5-25 wt %, based on the total weight of the thermoplastic composition.

It can be advantageous to use copolycarbonates and BPA homopolycarbonates with very low residual contents of volatile impurities. The copolycarbonates and BPA homopolycarbonates can be derived from a high purity BPA monomer having both a high level of organic purity (e.g., measured by high pressure liquid chromatography (HPLC) of greater than or equal to 99.6 wt %, preferably greater than or equal to 99.7 wt %) and a sulfur level of less than or equal to 2 parts per million (ppm) by weight as measured by Total Sulfur Analysis using combustion and coulometric detection. For example, the polymer components of the copolycarbonate, BPA homopolycarbonate, and/or composition can have a content of chlorobenzene and other aromatic chlorine compounds of less than 10 ppm, preferably less than 5 ppm and more preferably less than 2 ppm, dichloromethane of less than 1 ppm, preferably less than 0.5 ppm, monohydric phenols such as phenol, tert-butylphenol and cumylphenol of less than 15 ppm, preferably less than 5 ppm and more preferably less than 2 ppm, and alkanes of less than 10 ppm, preferably less than 5 ppm. In other aspects, the polymers can preferably have residual contents of: carbon tetrachloride of less than 0.01 ppm, diaryl carbonates, in particular diphenyl carbonate and di-tert-butyl phenolcarbonate, of less than 5 ppm, preferably less than 2 ppm, BPA and other bisphenols of less than 5 ppm, preferably less than 2 ppm and more preferably less than 0.5 ppm, sodium and other alkali metals and alkaline earth metals of less than 0.05 ppm, cresols of less than 1 ppm, preferably less than 0.2 ppm, phenolic OH groups of less than 300 ppm, preferably less than 200 ppm, more preferably less than 100 ppm, alkaline earth metals of less than 0.1 ppm, more preferably less than 0.05 ppm, pyridine of less than 1 ppm, preferably less than 0.1 ppm, nonhalogenated aromatic compounds such as xylene and toluene of less than 10 ppm, preferably less than 5 ppm, wherein each is based on the total weight of the copolycarbonate. For example, the polymer or composition can comprise less than 2 ppm by weight of each of calcium, magnesium, potassium, iron, nickel, copper, zinc, lithium, sodium, ammonium, trimethylammonium, triethylammonium, chloride, bromide, fluoride, nitrite, nitrate, phosphite, phosphate, sulfate, formate, acetate, citrate, and oxalate as residual impurities. In another example, the polymer or composition can comprise less than 2 ppm by weight of each of chloride, sodium, calcium, iron, nickel, copper, and zinc as residual impurities. It is to be understood that the foregoing residual impurities can exist as ions or in non-ionic forms (for example as triethylamine or formic acid). Methods for obtaining and measuring these amounts are described, for example, in US2012/0157653.

The copolycarbonates and BPA homopolycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumylphenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. In addition, the end-capping agent is present during manufacture of the copolycarbonate and/or BPA homopolycarbonate such that the polymer comprises a free hydroxyl level (hydroxyl end group content) of less than or equal to 250 ppm by weight, preferably less than or equal to 200 ppm by weight, more preferably less than or equal to 150 ppm by weight. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05-2.0 wt %. Combinations comprising linear polycarbonates and branched polycarbonates can be used.

In addition to the copolycarbonate and optionally the BPA homopolycarbonate, the thermoplastic composition further includes a poly(carbonate-arylate ester) copolymer (i.e., a poly(carbonate)-co-(monoaryl arylate ester) copolymer) comprising BPA carbonate units as described above and monoaryl arylate ester units of formula (8):

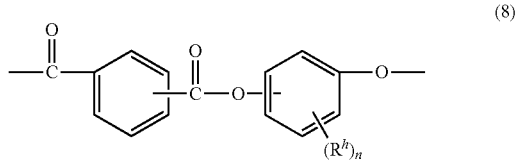

wherein each occurrence of $R^h$ is independently a halogen atom or a $C_{1-10}$ hydrocarbyl, preferably a $C_{1-10}$ alkyl, a halogen-substituted $C_{1-10}$ alkyl, a $C_{6-10}$ aryl, or a halogen-substituted $C_{6-10}$ aryl, and n is 0-4. Specifically, each $R^h$ can be independently a $C_{1-4}$ alkyl, and n can be 0-3, 0-1, or 0. For example, these poly(carbonate-arylate ester) copolymers can be of formula (9):

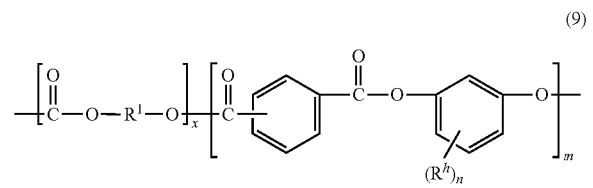

wherein $R^1$ contains at least one $C_{6-30}$ aromatic group and $R^h$, and n are as defined in formula (8), and the mole ratio of x:m is 99:1-1:99, or 95:5-5:95, or 90:10-10:90.

The monoaryl arylate ester units are present in an amount of 5-50 mol %, preferably 10-30 mol %, based on the sum of moles of monoaryl arylate ester units and BPA carbonate units.

In some aspects, the monoaryl-arylate ester unit (8) is derived from the reaction of a combination of isophthalic and terephthalic diacids (or derivatives thereof) with resorcinol (or reactive derivatives thereof) to provide isophthalate-terephthalate-resorcinol ("ITR") ester units of formula (8a):

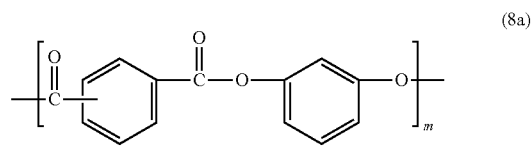

wherein m is 4-100, or 4-90, or 5-70, or 5-50, or 10-30. In an aspect, the ITR ester units are present in the poly (carbonate-arylate ester) copolymer in an amount greater than or equal to 95 mol %, or greater than or equal to 99 mol %, or greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

The poly(carbonate-arylate ester) copolymer can be a poly(bisphenol A carbonate)-co-(isophthalate-terephthalate-resorcinol ester) copolymer of formula (9a):

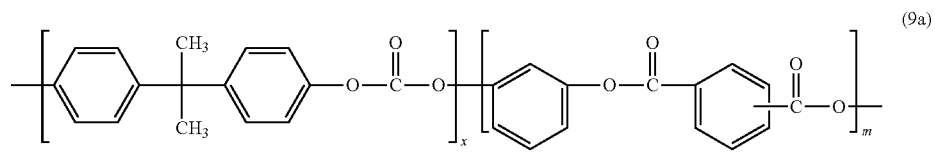

wherein m is 4-100, 4-90, 5-70, or 5-50, or 10-30, and the mole ratio of x:m is 99:1-1:99, or 90:10-10:90. The ITR ester units in formula 9(a) are present in the poly(carbonate-arylate ester) copolymer in an amount greater than or equal to 95 mol %, or greater than or equal to 99 mol %, or greater than or equal to 99.5 mol % based on the total moles of ester units in the copolymer.

Other carbonate units, other ester units, or a combination thereof can be present in the poly(carbonate-arylate ester) copolymer, in a total amount of 0.5-20 mol % based on the total moles of units in the poly(carbonate-arylate ester) copolymer, for example resorcinol carbonate units of formula (10) and bisphenol ester units of formula (11):

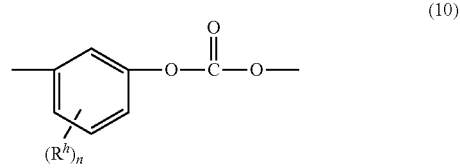

-continued

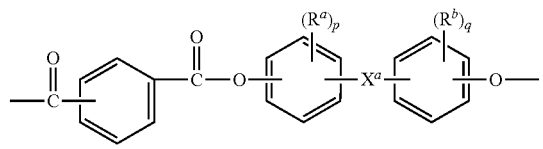

(11)

wherein, in the foregoing formulae, each $R^h$ is independently a $C_{1-10}$ hydrocarbon group, n is 0-4, $R^a$ and $R^b$ are each independently a $C_{1-12}$ alkyl, p and q are each independently integers of 0-4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. For example, the bisphenol ester units can be BPA phthalate ester units of formula (11a):

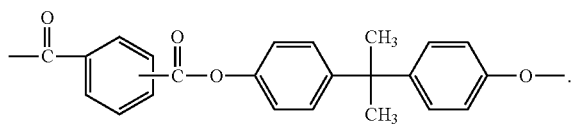

(11a)

For example, the poly(carbonate-arylate ester) copolymer can comprise 50-95 mol % of BPA carbonate units, 5-50 mol % of monoaryl arylate ester units of formula (8) or (8a), and optionally 1-20 mol %, preferably 1-5 mol % of resorcinol carbonate units, isophthalic acid-terephthalic acid-BPA phthalate ester units, or a combination thereof, based on the sum of moles of BPA carbonate units, monoaryl arylate ester units, resorcinol carbonate units, and isophthalic acid-terephthalic acid-BPA phthalate ester units.

The poly(carbonate-arylate ester) copolymer can be included in the thermoplastic composition in an amount of 10-50 wt %, preferably 15-50 wt %, more preferably 15-45 wt %, based on the total weight of the thermoplastic composition. In particular aspects, the thermoplastic composition includes the poly(carbonate-arylate ester) copolymer in an amount from 30-50 wt %, preferably 35-45 wt %, based on the total weight of the composition.

The poly(carbonate-arylate ester) copolymer comprising arylate ester units can be prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination thereof, isophthaloyl dichloride, terephthaloyl dichloride, or a combination thereof. The polyester blocks can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups, or a trifunctional or multifunctional carboxylic acid has been incorporated, can be used. Furthermore, it can be desirable to have various concentrations of acid and hydroxyl end groups on the polyester blocks, depending on the ultimate end use of the composition.

The poly(carbonate-arylate ester) copolymer can have an $M_w$ of 2,000-100,000 g/mol, or 3,000-75,000 g/mol, or 4,000-50,000 g/mol, or 5,000-35,000 g/mol, or 17,000-35,000 g/mol. In a particular aspect, the poly(carbonate-arylate ester) copolymer has an Mw of 25,000-35,000 g/mol, preferably 27,500-32,500 g/mol. Molecular weight determinations are performed using GPC using polycarbonate standards.

In an aspect, the thermoplastic composition includes 35-45 wt % of the poly(bisphenol A carbonate)-co-(isophthalate-terephthalate-resorcinol ester) copolymer having an Mw of 27,500-32,500 g/mol, as determined by GPC.

In particular aspects, the thermoplastic composition does not include a polyester resin or a polyether ester block copolymer. As used herein, the term "polyester resin" does not refer to the monoaryl-arylate ester unit or an optional polyester block (i.e., "ester unit") of the poly(carbonate-arylate ester), as described above. For example, the thermoplastic composition does not include polycyclohexylidene cyclohexanedicarboxylate, poly(ethylene terephihalate-co-1,4-cyclohexanedimethylene terephthalate), poly(1,4-cyclohexanedimethylene terephthalate), or the like.

The thermoplastic composition can further include an acid stabilizer. The acid stabilizer can be present in the thermoplastic composition in an amount of 1-20 ppm, preferably 2-10 ppm. It has been found that including an acid stabilizer in the polycarbonate compositions can further improve the color stability of the compositions after the compositions are molded under aggressive conditions and/or after the compositions are aged at an elevated temperature for a prolonged period of time.

An Arrhenius acid (i.e., protic acid) can be used so long as the type and amount selected is such that molding properties are improved, and color and polycarbonate degradation are minimized. For example, an acid with a pKa of less than or equal to 5 (measured in water) can be used. Use of a stronger acid, i.e., an acid having a pKa (measured in water) of less or equal to 2, or 2-1, over a weaker acid, i.e., having a pKa (measured in water) of greater than 2, or greater than 2-4.5, has a stronger effect on both molding and heat aging. Lower amounts of the stronger acid can therefore be used relative to the weaker acid, for the same color stabilization effect. In one aspect, a stronger acid having a pKa of less than 2 is used; in other aspects, a weaker acid having a pKa of greater than 2 is used. In some aspects, an acid having a pKa of less than 4.5 is used. Exemplary acid stabilizers include Bronsted acid, a Lewis acid, an ester of an acid or an ester thereof containing a sulfur atom, or a combination thereof.

Acid stabilizers can include, for example, phosphoric acid; phosphorus acid; hypophosphorous acid; pyrophosphoric acid; polyphosphoric acid; an organosulfonic stabilizer; sulfurous acids; ammonium salts of sulfuric acids, halogenated carboxylic acids such as, for example, trifluoroacetic acid, trichloroacetic acid, or the like. In an exemplary aspect, a useful weaker acid is phosphoric acid or phosphorous acid, and a useful stronger acid is p-toluenesulfonic acid. In particular aspects, the acid stabilizer comprises phosphoric acid, phosphorus acid, butyl tosylate, p-toluene sulfonic acid, or a combination thereof.

The organosulfonic stabilizer can be an aryl or aliphatic sulfonic acid, including a polymer thereof, an aryl or an aliphatic sulfonic acid anhydride, or an aryl or aliphatic ester of an aryl or aliphatic sulfonic acid, or a polymer thereof. In particular, the organosulfonic stabilizer is a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; an anhydride of a $C_{1-30}$ alkyl sulfonic acid, a $C_{6-30}$ aryl sulfonic acid, a $C_{7-30}$ alkylarylene sulfonic acid, or a $C_{7-30}$ arylalkylene sulfonic acid; or a $C_{6-30}$ aryl ester of a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; or a $C_{1-30}$ aliphatic ester of a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer. A combination of one or more of the foregoing can be used.

For example, the organosulfonic stabilizer can be of formula (12):

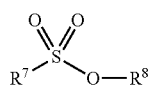

(12)

wherein $R^7$ is a $C_{1-30}$ alkyl, a $C_{6-30}$ aryl, a $C_{7-30}$ alkylarylene, or a $C_{7-30}$ arylalkylene, and $R^8$ is a $C_{1-30}$ alkyl or a group of the formula —$S(=O)_2$—$R^7$; or $R^7$ is a polymer unit derived from a $C_{2-32}$ ethylenically unsaturated aromatic sulfonic acid or its ester, and $R^8$ is hydrogen. The $C_{2-32}$ ethylenically unsaturated aromatic sulfonic acid can be of formula (12a)

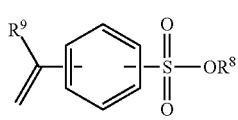

(12a)

wherein $R^9$ is hydrogen or methyl, and $R^8$ is as defined in formula (8). Preferably the ethylenically unsaturated group and the sulfonic acid or ester group are located para on the phenyl ring.

The thermoplastic composition can also contain an epoxy additive. The inclusion of an epoxy compound can be used as a chain extender to improve molecular weight stability of the thermoplastic composition after long term exposure to high humidity conditions at elevated temperatures (for instance at 85° C. and 85% relative humidity) or autoclaving at temperatures of 121° C., 134° C., 155° C., or other temperatures above 100° C. Epoxy compounds useful as additives include epoxy modified acrylic oligomers or polymers (such as a styrene-acrylate-epoxy polymer, prepared from for example a combination of: a substituted or unsubstituted styrene such as styrene or 4-methylstyrene; an acrylate or methacrylate ester of a $C_{1-22}$ alkyl alcohol such as methyl acrylate, methyl methacrylate, ethyl acrylate, butyl acrylate, or the like; and an epoxy-functionalized acrylate such as glycidyl acrylate, glycidyl methacrylate, 2-(3,4-epoxycyclohexyl)ethyl acrylate, 2-(3,4-epoxycyclohexyl)ethyl methacrylate, or the like), or an epoxy carboxylate oligomer based on cycloaliphatic epoxides (such as, for example, 3,4-epoxycyclohexylmethyl-3,4-epoxycyclohexylcarboxylate, or the like). Epoxy additives can be used in amounts of up to 1 wt %, or 0.001-1 wt %, or 0.001-0.5 wt %, based on the total weight of the thermoplastic composition.

The thermoplastic compositions can include various additives ordinarily incorporated into polymer compositions of this type, with the proviso that the additive(s) are selected so as to not significantly adversely affect the desired properties of the thermoplastic composition, in particular melt flow, thermal, transparency, and surface properties. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as titanium dioxide, carbon black, and organic dyes, surface effect additives, radiation stabilizers, flame retardants, anti-drip agents, and impact modifiers. In an aspect, the thermoplastic composition further comprises a processing aid, a heat stabilizer, an ultraviolet light absorber, a colorant, a flame retardant, an impact modifier, or a combination thereof. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0-5 wt % or 0.01-5 wt %, based on the total weight of the thermoplastic composition.

The thermoplastic compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

The thermoplastic compositions can have a haze of less than 1.5%, or less than 1.0%, or less than 0.75%, as measured in the range of 250 nm to 700 nm according to ASTM D1003-00 on a molded plaque with a thickness of 1 mm.

The thermoplastic composition can be transparent. The thermoplastic compositions can have a total transmission of greater than 85%, or greater than 88% or greater than 90%, as measured in the range of 250 nm to 700 nm according to ASTM D1003-00 on a molded plaque with a thickness of 1 mm. For example, the total transmission can be at least 86%, at least 88%, or at least 90% at 1 mm.

The thermoplastic compositions can have a refractive index of greater than 1.59 or greater than 1.60 at 587.6 nm or a refractive index of greater than 1.57 or greater than 1.58 at 940 nm, as measured according to ISO 489 on a molded plaque with a thickness of 1 mm.

The thermoplastic compositions can have a melt volume flow rate (MVR) of greater than 20 cubic centimeters per ten minutes ($cm^3/10$ min), as measured at 330° C./2.16 kg at 300 second dwell according to ISO 1133. For example, the thermoplastic composition can have an MVR of 20-50 $cm^3/10$ min, preferably 25 to 50 $cm^3/10$ min, more preferably 30 to 50 $cm^3/10$ min.

The thermoplastic composition can have a Vicat B120 softening temperature of 155° C. or higher, preferably 160° C. or higher, as measured according to ISO 306.

The thermoplastic compositions can have an Izod notched impact energy of at least 10 kilojoules per square meter (kJ/m$^2$), or of at least 10 kJ/m$^2$, as measured at 23° C. according to ISO 180.

The thermoplastic compositions can have a pencil hardness of at least B, preferably at least HB, as measured by ASTM D 3363 on a 3.2 mm thick disc with 10 cm diameter.

The thermoplastic compositions can have a tensile modulus of greater than 2450 MPa, preferably greater than 2500 MPa, more preferably greater than 2550 MPa, still more preferably greater than 2600 MPa, as measured in accordance with ISO 527 with speed of 50 mm/min.

The heat deflection temperature (HDT) of the thermoplastic composition can be 145-240° C., more preferably 155-240° C., even more preferably 160-240° C., still more preferably 175-240° C., measured at 0.45 megapascal (MPa) according to ISO 75/Bf or ASTM D638.

Remarkably, the thermoplastic composition demonstrates a high HDT while maintaining a good transmission and low haze. For example, the thermoplastic composition can have an HDT of 145-240° C. or 155-240° C., a total transmission of 85% or greater or 88% or greater, and a haze of less than 1.5% or less than 1.0%.

In a particular embodiment, the thermoplastic composition includes 35-45 wt % of the poly(carbonate-arylate ester) copolymer and achieves a tensile modulus of greater than 2500 MPa, a Vicat softening temperature of at least 160° C., an HDT of at least 150° C. at 0.45 MPa, an MVR of 25-40 cm$^3$/10 min, a total transmission of at least 88%, and a haze of less than 1.0%.

The thermoplastic compositions can have excellent color. For example, the thermoplastic compositions can have a yellowness index (YI) of less than 20, preferably less than 15, more preferably less than 10, even more preferably less than 5, as measured by ASTM D1925 on a plaque having a thickness of 1 mm, 2.5 mm, or 3 mm. The thermoplastic compositions can be molded at a temperature of 100-175° C. above the glass transition temperature of the thermoplastic composition, for example at 310-360° C., for a residence time of 2-20 minutes.

The thermoplastic compositions have excellent color stability during exposure for prolonged time to UV light in accelerated weathering per ISO 11341 standard, further referred as weathering. For example, the thermoplastic compositions can have an increase in yellowness index (ΔYI) of less than 20, more preferably less than 15 after 2,000 hours of heat aging at 155° C., as measured by ASTM D1925 on a molded plaque having a thickness of 1 mm. For example, the thermoplastic compositions can have a ΔYI of less than 8, more preferably less than 3 after 1,600 hours of heat aging at 140° C., on a molded plaque having a thickness of 1 mm.

The thermoplastic compositions have excellent color stability during exposure for prolonged time at elevated temperatures in the presence of moisture, referred to as weathering. For example, the thermoplastic composition can have a ΔYI of less than 5, more preferably less than 4 after 1,000 hours of weathering per ISO 11341 on a molded plaque having a thickness of 1 mm. For example, the thermoplastic composition can have a ΔYI of less than 8, more preferably less than 5 after 1,600 hours of weathering at 80° C. and 85% relative humidity, on a molded plaque having a thickness of 1 mm.

Shaped, formed, or molded articles comprising the thermoplastic compositions are also provided. The compositions can be molded into useful shaped articles by a variety of methods, such as injection molding, injection-compression molding, heat-cool molding, extrusion, rotational molding, blow molding, and thermoforming. The article can be a molded article, a thermoformed article, an extruded article, an extruded layer (a film or a sheet), one or more layers of a multi-layer article, a substrate for a coated article, or a substrate for a metallized article made from the thermoplastic composition. The multi-layer article can be a laminated multi-layer article. The distinction between a film and a sheet is not critical. A film can have an exemplary thickness of 100 micrometers to 5 mm, and the sheet can have an exemplary thickness of 5 mm to 5 cm.

Advantageously, the articles have no significant part distortion or discoloration when the articles are subjected to a secondary operation such as over-molding, lead-free soldering, wave soldering, low temperature soldering, or coating with high temperature curing, or a combination thereof. High temperature cure of the coating can be, for example, 100° C. or higher, for example 100-250° C. In some aspects, "no significant part distortion" includes a volume distortion of less than 10 volume percent (vol %), or less than 5 vol %, or less than 1 vol %. Significant discoloration can be detected by the unaided eye at a distance of 18 inches.

In some aspects, at least a portion of a surface of the article is metallized or is coated with a hardcoat, a UV-protective coat, an anti-refractive coat, an anti-reflective coat, a scratch-resistant coat, or a combination thereof. In some aspects, the coating is applied or cured at a temperature of 100° C. or higher, for example 100-250° C.

The article can be a lens (e.g., a camera lens, a mobile phone camera lens, a table camera lens, a security camera lens, an automotive camera lens, a scanner lens, a copier lens, an illumination device lens, a safety glass lens, an ophthalmic corrective lens, a projector lens, an imaging lens, an auto lens, a sensor lens (for example a proximity sensor lens, a gesture control lens, or an infrared sensor lens)), a light guide, a waveguide, a collimator, an optical fiber, a visor, a window, a door, a display screen, an electronic device, a scientific or medical device (e.g., a blood bag, a solution bag, an intravenous connector, a catheter, a medical storage tray, medical tubing, a cannula, an implantable prosthesis, a heart valve, a vascular graft, a pacemaker lead, a defibrillator lead, an A-V shunt, a Petri dish,), a safety shield, a fire shield, wire or cable sheathing, a tray, a screen, an enclosure, a dish, glazing, packaging, a gas barrier, an anti-fog layer, or an anti-reflective layer.

In addition, the thermoplastic compositions can be used as a component of a wide variety of devices and applications, for example a component of a device comprising a lens, such as a camera, a mobile phone camera, a flashlight, a sensor such as a touch sensor, a proximity sensor, a gesture control sensor, or an infrared sensor, ophthalmic corrective glasses, safety glasses, an illumination device, a lighthouse, a light emitting diode (LED), or a vehicle (e.g., a lens holder, a reflector, a camera flash lens, a vehicle headlight, running light, foglight, or rearlight). As used herein a "vehicle" means any transportation device, for example bicycles, scooters, motorcycles, automobiles, buses, trains, boats, ships, and aircraft.

Other articles include a device comprising a light guide, a device comprising a waveguide, a device comprising a collimator, a device comprising an optical fiber, a device comprising an optical film, a device comprising a device comprising a lighting element, including LEDs and OLEDs (e.g., a light bulb, a housing, a cover, a bezel, a vehicle headlight, running light, foglight, or rearlight, a flashlight, a reflector, or a signal indicator), a device comprising a window, such as a domestic appliance, vehicle, or building, an device comprising a door, such as a domestic appliance, vehicle, or building, or a device comprising a tray (e.g., a food tray for a vehicle).

Still other articles include a component of a scientific or medical device (e.g., a syringe, a blood filter housing, a blood bag, a solution bag, an intravenous connector, a dialyzer, a catheter, a medical storage tray, a medical appliance, medical tubing, a cardiac pacemaker, a cardiac defibrillator, a cannula, an implantable prosthesis, a cardiac assist device, a heart valve, a vascular graft, an extracorporeal device, an artificial organ, a pacemaker lead, a defibrillator lead, a blood pump, a balloon pump, an A-V shunt, a membrane for cell encapsulation, a wound dressing, an artificial joint, an orthopedic implant a Petrie dish, a face shield, a respirator, a sensor), a component of an electronic device such as a handheld electronic device, a tablet, a computer, a monitor, a business machine such as a copier, a fuse, an analytical device, or a sensor (e.g., a housing, an electrical connector, for any of the foregoing), a component of a photovoltaic device, a component of a safety device (e.g., a visor, a safety goggle, a face shield, a fire shield, a helmet, a respirator, a knee pad, elbow pad, or other protective body part pad), a component of a display screen, including a liquid crystal display screen, or an organic light-emitting diode display screen, a component of a dish, a component of a heater, such as a watercooker, a component of a mold, for example for foodstuffs such as chocolate, a component of a screen such as a mining ore screen, a component of a conveyor such as a conveyor belt, a component of an enclosure such as an animal cage, a structural component of a building, a vehicle, or an appliance such as a pump, a microwave, a dishwasher, or a stove, a component of packaging, a component of a gas barrier, a component of an encapsulant, a component of a label, a component of a gas barrier, a component of an anti-fog assembly, or a component of an anti-reflective assembly.

The disclosure is further illustrated by the following non-limiting examples.

EXAMPLES

The materials used in the Examples are described in Table 1.

TABLE 1

| Component | Chemical Description | Source |
|---|---|---|
| PPPBP-PC | N-phenylphenolphthaleinylbisphenol (PPPBP), 2,2-bis(4-hydro) - BPA polycarbonate copolymer, 33 mol % PPPBP, para-cumylphenol (PCP) end-capped, Mw of 22,000-24,000 g/mol as determined by GPC using BPA polycarbonate standards | SABIC |
| PC-1 | Linear BPA homopolycarbonate, produced via interfacial polymerization, PCP end-capped, Mw of 21,000-22,000 g/mol as determined by GPC using polycarbonate standards | SABIC |
| PC-2 | Linear BPA homopolycarbonate, produced via interfacial polymerization, PCP end-capped, Mw of 18,000-19,000 g/mol as determined by GPC using polycarbonate standards | SABIC |
| PC-3 | Linear BPA homopolycarbonate, produced via interfacial polymerization, PCP end-capped, Mw of 30,000-31,000 g/mol as determined by GPC using polycarbonate standards | SABIC |
| ITR-PC | Isophthalic acid-terephthalic acid-resorcinol (ITR) - BPA copolyestercarbonate copolymer, 19 mol % ITR, PCP end-capped, produced via interfacial polymerization, Mw of 29,000-31,000 g/mol as determined by GPC using polycarbonate standards | SABIC |
| AO-1 | Tris(2,4-di-t-butylphenyl)phosphite (IRGAFOS 168) | Ciba |
| AO-2 | Octadecyl-3-(3,5-di-tert-butyl-4-hydroxyphenyl) propionate (IRGANOX 1076) | BASF |
| AO-3 | Tetrakis(2,4-di-tert-butylphenyl)[1,1-biphenyl]-4,4'diylbisphosphonite (PEPQ) | Clariant |
| AO-4 | 7-oxabicyclo[4.1.0]heptane-3-carboxylic acid,7-oxabicyclo[4.1.0]hept-3-ylmethyl ester (ERL4221) | Dow |
| PETS | Palmitic/stearic acid (50/50) ester of dipenta/pentaerythritol (LOXIOL EP8578) | Cognis |
| UVA 234 | 2-[2-hydroxy-3,5-di-(1,1-dimethylbenzyl)]-2H-benzotriazol | BASF |
| UVA 235 | 2-(2 hydroxy-5-t-octylphenyl) benzotriazole | BASF |
| Tosylate | Premix of 0.3 wt % of butyl tosylate (Sigma-Aldrich) in PC-2 | SABIC |

The compositions were made as follows. All solids were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. It will be recognized by one skilled in the art that the method is not limited to these processing steps or processing equipment.

Extrusion of all materials was performed on a 25 mm Werner-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), 270° C. (zone 3), and 290-330° C. (zone 4-8). Screw speed was 300 rpm and throughput was between 10 and 25 kg/hr. Samples of the compositions were molded after drying at 130-135° C. for 4-6 hours on a 45-ton Engel molding machine with 22 mm screw, 75-ton Engel molding machine with 30 mm screw or 110-ton Engel molding machine with 30 mm screw, operating at a melt temperature of 310-360° C. with a mold temperature of 80-150° C. with a typical residence between 3 and 15 minutes.

Yellowness Index (YI) was calculated from the transmission spectrum from a MacBeth ColorEye7000A according to ASTM D1925. Parts with thickness of 1 or 3 mm were used, as specified in the Examples. Tensile stress and tensile modulus were measured in accordance with ISO 527 with speed of 50 mm/min. Flexural stress and flexural modulus were measured in accordance with ISO 178. ISO notched Izod impact was measured at 23° C. or −30° C. according to ISO 180/1A using a multipurpose test specimen in accordance with ISO 3167 TYPE. Vicat B120 softening temperature was measured according to ISO 306. Heat deflection temperature (HDT) was measured flat on an 80 mm×10 mm×4 mm bar with a 64 mm span at 0.45 MPa or 1.8 MPa according to ISO 75/Bf. Melt volume flow rate (MVR) was measured at 330° C./2.16 Kg at 300 second dwell according to ISO 1133. Transmission and haze were measured in the range of 250 nm to 700 nm according to ASTM D1003-00 on a molded plaque with thickness of 1 mm.

Plaques molded of the formulations were tested for artificial weathering performance using the ISO 11341 test protocol, using an Atlas Ci5000 Xenon Weatherometer® apparatus. Heat aging was done by placing molded parts in an air circulating oven at 140° C. or 155° C. Parts were removed from the oven and allowed to cool before testing. The results are provided as YI values based on exposure time (hours, h) or normalized to the YI at 0 hours and listed as ΔYI based on total exposure time (h).

Examples 1-6

The formulations and testing results for Examples 1-6 are shown in Table 2. YI after standard and abusive molding are determined on a molded plaque with a thickness of 3 mm.

TABLE 2

| | Unit | CEx1 | CEx2 | Ex3 | Ex4 | CEx5 | CEx6 |
|---|---|---|---|---|---|---|---|
| Component | | | | | | | |
| PPPBP-PC | % | 99.28 | 63.7 | 44.8 | 63.7 | | |
| ITR-PC | % | | | 45 | 35 | 45 | 90 |
| PC-1 | | | 28.58 | | | 54.41 | |
| PC-2 | | | | 9.48 | 0.58 | | |
| PC-3 | % | | 7 | | | | 9.31 |
| AO-1 | % | 0.08 | 0.08 | 0.08 | 0.08 | | |
| AO-2 | % | 0.04 | 0.04 | 0.04 | 0.04 | | |
| AO-3 | % | | | | | 0.06 | 0.06 |
| AO-4 | % | | | | | 0.03 | 0.03 |
| PETS | % | 0.3 | 0.3 | 0.3 | 0.3 | 0.3 | 0.3 |
| UVA 235 | % | | | | | 0.2 | |
| UVA 234 | % | 0.3 | 0.3 | 0.3 | 0.3 | | 0.3 |
| Property | | | | | | | |
| YI after molding | | | | | | | |
| at 300° C./5 min | | | | 4.25 | 4.52 | 2.72 | 4.93 |
| at 310° C./5 min | | | 2.97 | | | | |
| at 330° C./5 min | | 6.16 | | | | | |
| at 350° C./5 min | | 14.68 | | | | | |
| at 360° C./5 min | | | 9.03 | 6.43 | 7.58 | 6.60 | 10.90 |
| ΔYI, Abusive-Standard | | 8.52 | 6.06 | 2.18 | 3.06 | 3.88 | 5.97 |

The standard molding conditions were determined by the heat and processibility of the material to allow proper part production. The standard molding conditions were 300° C. for 5 minutes for the ITR-PC/PC blends (CEx5, CEx6) and PPPBP-PC/ITR-PC blends (Ex3 and Ex4), 310° C. for 5 minutes for the PPPBP/PC blend (CEx2), or 330° C. for 5 minutes for PPPBP-PC (CEx1). The abusive molding conditions were 350° C. for 5 minutes for CEx1 or 360° C. for 5 minutes for CEx2, Ex3, Ex4, CEx5, and CEx6. The difference in YI (ΔYI) between the plaques molded under standard and abusive conditions are reported.

The composition containing only PPPBP-PC (CEx1) has the largest abusive YI and ΔYI under abusive molding conditions, even when the abusive molding condition was milder than for the other examples, indicating relatively poor color stability. Blending PPPBP-PC and PC (CEx2) has a beneficial effect of lowering the abusive YI and the ΔYI to some degree, but ΔYI is still relatively high at 6.06. The composition containing blends of ITR-PC and PC (CEx6) also had relatively high abusive YI and ΔYI of 5.97.

Compositions including PPPBP-PC/ITR-PC blends (Ex3 and Ex4) had ΔYI that were significantly lower than for the other examples, with values of 2.18 and 3.06, respectively. Although PPPBP-PC and ITR-PC individually have poor color stability (considering CEx1 and CEx6), it was surprisingly discovered that blends of PPPBP-PC and ITR-PC (Ex3 and Ex4) had much improved color stability. This improved stability is further demonstrated by comparing the results of Ex3 and Ex4 with blends of either PPPBP-PC or ITR-PC in similar loadings with PC (CEx2 and CEx5).

The formulations and testing results for Examples 7-9 are shown in Tables 3-5. YI after molding, weathering, and heat ageing are determined on a molded plaque with a thickness of 1 mm.

TABLE 3

| Component | Unit | Ex7 | Ex8 | CEx9 |
|---|---|---|---|---|
| PPPBP-PC | wt % | 63.7 | 63.7 | 63.7 |
| ITR-PC | wt % | 35.6 | 35.6 | — |
| PC-1 | wt % | — | — | 35.4 |
| AO-1 | wt % | 0.08 | 0.08 | 0.08 |
| AO-2 | wt % | 0.04 | 0.04 | 0.04 |
| PETS | wt % | 0.3 | 0.3 | 0.3 |
| UVA 234 | wt % | 0.3 | 0.3 | 0.3 |
| Tosylate premix | wt % | — | 0.2 | 0.2 |
| Property | | | | |
| YI after molding | | | | |
| at 310° C./5 min | | 2.87 | 2.06 | 1.80 |
| at 330° C./10 min | | 3.92 | 2.59 | 1.93 |
| ΔYI | | 1.05 | 0.53 | 0.13 |

TABLE 4

| Weathering per ISO 11341, YI | Ex7 | Ex8 | CEx9 |
|---|---|---|---|
| 0 hours | 2.06 | 2.09 | 1.80 |
| 500 hours | 5.98 | 5.65 | 8.09 |
| 1,000 hours | 6.40 | 6.16 | 11.21 |
| 1,800 hours | 6.79 | 6.55 | 13.58 |
| 2,300 hours | 7.03 | 6.86 | 14.16 |
| 2,500 hours | 6.96 | 6.85 | 14.27 |
| 3,000 hours | 7.70 | 6.89 | 14.83 |
| 3,500 hours | 8.21 | 7.40 | 15.38 |
| ΔYI at 1,000 hours | 4.34 | 4.07 | 9.41 |

TABLE 5

| Heat ageing at 155° C., YI | Ex7 | Ex8 | CEx9 |
|---|---|---|---|
| 0 hours | 2.06 | 2.09 | 1.80 |
| 150 hours | 2.15 | 2.76 | 2.33 |
| 300 hours | 2.70 | 3.50 | 2.99 |

TABLE 5-continued

| Heat ageing at 155° C., YI | Ex7 | Ex8 | CEx9 |
|---|---|---|---|
| 550 hours | 3.81 | 4.87 | 4.25 |
| 1,000 hours | 6.34 | 7.98 | 7.06 |
| 1,500 hours | 10.40 | 13.10 | 11.33 |
| 2,000 hours | 15.85 | 19.66 | 16.78 |
| ΔYI at 2,000 hours | 13.79 | 17.57 | 14.98 |

The results shown in Tables 3-5 demonstrate that the PPPBP-PC copolymer blended with PC-1 (CEx9) has good color stability under abusive molding conditions, good heat ageing with acceptable color shift after 2,000 hours of oven ageing at 155° C. with a ΔYI of less than 20 (Table 5), but poor weathering with high color shifts after 1,000 hours of weathering with a ΔYI of greater than 9 (Table 4). The PPPBP-PC blended with ITR-PC (Ex7 and Ex8) had a ΔYI that was 50% less than that of CEx9 after 1,000 hours of weathering (Table 4) with a ΔYI less than 5 and had excellent color stability under abusive molding conditions. Ex7 and Ex8 also demonstrated good heat ageing with acceptable color shift with a ΔYI of less than 20 after 2,000 hours of oven ageing at 155° C. (Table 5). Ex8 also demonstrates that further including an acid stabilizer (butyl tosylate) improves the balance of color after both abusive molding and oven ageing compared to Ex7.

The formulations and testing results for Examples 10-18 are shown in Tables 6-8. YI after molding, weathering, and oven ageing are determined on a molded plaque with a thickness of 1 mm.

TABLE 6

| | Unit | CEx10 | Ex11 | Ex12 | Ex13 | CEx14 | Ex15 | Ex16 | Ex17 | Ex18 |
|---|---|---|---|---|---|---|---|---|---|---|
| Component | | | | | | | | | | |
| PPPBP-PC | wt % | 63.7 | 63.7 | 63.7 | 63.7 | 44.8 | 44.8 | 44.8 | 44.8 | 44.8 |
| ITR-PC | wt % | — | 15 | 25 | 35 | — | 15 | 25 | 35 | 45 |
| PC-3 | wt % | 35.38 | 20.38 | 10.38 | 0.38 | 54.31 | 39.31 | 29.31 | 19.31 | 9.31 |
| AO-1 | wt % | 0.08 | 0.08 | 0.08 | 0.08 | 0.08 | 0.08 | 0.08 | 0.08 | 0.08 |
| AO-2 | wt % | 0.04 | 0.04 | 0.04 | 0.04 | 0.04 | 0.04 | 0.04 | 0.04 | 0.04 |
| PETS | wt % | 0.3 | 0.3 | 0.3 | 0.3 | 0.3 | 0.3 | 0.3 | 0.3 | 0.3 |
| UVA 234 | wt % | 0.3 | 0.3 | 0.3 | 0.3 | 0.3 | 0.3 | 0.3 | 0.3 | 0.3 |
| Tosylate premix | wt % | 0.2 | 0.2 | 0.2 | 0.2 | 0.167 | 0.167 | 0.167 | 0.167 | 0.167 |
| ITR content | wt % | 0.00 | 2.85 | 4.75 | 6.65 | 0.00 | 2.85 | 4.75 | 6.65 | 8.55 |
| PPPBP content | wt % | 21.02 | 21.02 | 21.02 | 21.02 | 21.02 | 14.78 | 14.78 | 14.78 | 14.78 |
| Property | | | | | | | | | | |
| YI after molding* | | | | | | | | | | |
| at 310° C./5 min | | 1.69 | 1.85 | 1.95 | 2.04 | 1.59 | 1.69 | 1.80 | 1.88 | 1.95 |
| at 355° C./10 min | | 2.27 | 2.73 | 2.86 | 2.94 | 1.93 | 2.21 | 2.63 | 3.29 | 3.22 |
| ΔYI | | 0.58 | 0.88 | 0.91 | 0.90 | 0.33 | 0.52 | 0.83 | 1.41 | 1.27 |

TABLE 7

| Heat ageing at 140° C., YI | CEx10 | Ex11 | Ex12 | Ex13 | CEx14 | Ex15 | Ex16 | Ex17 | Ex18 |
|---|---|---|---|---|---|---|---|---|---|
| 0 hours | 1.69 | 1.85 | 1.95 | 2.04 | 1.59 | 1.69 | 1.80 | 1.88 | 1.95 |
| 125 hours | 1.91 | 2.03 | 2.12 | 2.22 | 1.77 | 1.86 | 1.95 | 2.04 | 2.08 |
| 250 hours | 2.07 | 2.25 | 2.33 | 2.42 | 1.97 | 2.07 | 2.16 | 2.22 | 2.30 |
| 600 hours | 2.48 | 2.68 | 2.76 | 2.88 | 2.34 | 2.47 | 2.56 | 2.63 | 2.68 |
| 1,600 hours | 4.47 | 4.89 | 5.02 | 5.19 | 4.34 | 4.65 | 4.84 | 4.99 | 5.12 |
| ΔYI at 125 hours | 0.22 | 0.18 | 0.17 | 0.18 | 0.18 | 0.17 | 0.16 | 0.16 | 0.13 |
| ΔYI at 250 hours | 0.38 | 0.40 | 0.38 | 0.38 | 0.38 | 0.38 | 0.37 | 0.35 | 0.36 |
| ΔYI at 600 hours | 0.79 | 0.83 | 0.81 | 0.84 | 0.75 | 0.78 | 0.77 | 0.75 | 0.73 |
| ΔYI at 1,600 hours | 2.78 | 3.04 | 3.07 | 3.15 | 2.75 | 2.96 | 3.04 | 3.11 | 3.17 |

TABLE 8

| Weathering per ISO 11341, YI | CEx10 | Ex11 | Ex12 | Ex13 | CEx14 | Ex15 | Ex16 | Ex17 | Ex18 |
|---|---|---|---|---|---|---|---|---|---|
| 0 hours | 1.69 | 1.85 | 1.95 | 2.04 | 1.59 | 1.69 | 1.80 | 1.88 | 1.95 |
| 125 hours | 4.84 | 4.20 | 3.94 | 3.81 | 4.41 | 3.87 | 3.65 | 3.54 | 3.49 |
| 250 hours | 6.17 | 5.17 | 4.77 | 4.58 | 5.38 | 4.53 | 4.32 | 4.16 | 4.05 |
| 600 hours | 8.46 | 6.63 | 6.16 | 5.86 | 7.53 | 6.28 | 5.63 | 5.49 | 5.18 |
| 1,600 hours | 11.11 | 8.21 | 6.96 | 6.31 | 9.78 | 7.30 | 6.44 | 5.90 | 5.78 |
| ΔYI at 125 hours | 3.15 | 2.35 | 1.99 | 1.77 | 2.82 | 2.18 | 1.86 | 1.66 | 1.55 |
| ΔYI at 250 hours | 4.49 | 3.32 | 2.82 | 2.54 | 3.78 | 2.84 | 2.52 | 2.28 | 2.11 |
| ΔYI at 600 hours | 6.77 | 4.78 | 4.21 | 3.82 | 5.93 | 4.59 | 3.83 | 3.61 | 3.24 |
| ΔYI at 1,600 hours | 9.42 | 6.36 | 5.01 | 4.27 | 8.19 | 5.61 | 4.64 | 4.02 | 3.83 |
| ΔYI improvement (%) vs CEx4 | | | | | | | | | |
| at 600 hours | 0 | 29 | 38 | 44 | 0 | 23 | 35 | 39 | 45 |
| at 1,600 hours | 0 | 32 | 47 | 55 | 0 | 31 | 43 | 51 | 53 |

The results shown in Table 8 demonstrate that compositions including 15 wt % or more of ITR-PC resulted in the improved weathering performance. The ΔYI for Ex11 and Ex15 show improvements of more than 20% relative to the ΔYI of comparative examples without ITR-PC after prolonged weathering at both 600 hours and 1,600 hours. This is achieved for both lower loadings of PPPBP-PC (45 wt %, Ex15 vs CEx14) and higher loadings of PPPBP-PC (63.7 wt %, Ex11 vs CEx10). Further improvements in weathering performance are achieved with higher loadings of ITR-PC, both at lower PPPBP-PC loadings (Ex15-18 vs CEx14) and higher PPPBP-PC loadings (Ex11-13 vs CEx10) with improvements exceeding 40% or even 50%. The compositions including ITR-PC also retained good color retention after abusive molding at 355° C. for 10 minutes (Table 6) and after heat ageing at 140° C. for up to 1,600 hours (Table 7).

The formulations and testing results for Examples 19-22 are shown in Table 9.

TABLE 9

| Component | Unit | Ex19 | Ex20 | Ex21 | Ex22 |
| --- | --- | --- | --- | --- | --- |
| PPPPBP-PC | wt % | 44.8 | 44.8 | 63.7 | 63.7 |
| ITR-PC | wt % | 45 | 45 | 35 | 35 |
| PC-2 | wt % | 9.48 | 9.28 | 0.58 | 0.38 |
| AO-1 | wt % | 0.08 | 0.08 | 0.08 | 0.08 |
| AO-2 | wt % | 0.04 | 0.04 | 0.04 | 0.04 |
| PETS | wt % | 0.3 | 0.3 | 0.3 | 0.3 |
| UVA 234 | wt % | 0.3 | 0.3 | 0.3 | 0.3 |
| Tosylate Premix | wt % | — | 0.2 | — | 0.2 |
| Property | | | | | |
| Flexural modulus, 2 mm/min | MPa | 2422 | 2464 | 2391 | 2504 |
| Flexural stress, yield, 2 mm/min | MPa | 108 | 108 | 110 | 112 |
| Vicat Softening Temp, B/120 | ° C. | 160 | 161 | 171 | 171 |
| HDT 1.8 MPa | ° C. | 138 | 137 | 147 | 147 |
| HDT 0.45 MPa | ° C. | 152 | 154 | 162 | 162 |
| Izod Impact, notched, 23° C. | kJ/m$^2$ | 11.0 | 10.9 | 10.1 | 10.4 |
| Izod Impact, notched, −30° C. | kJ/m$^2$ | 10.0 | 10.1 | 9.8 | 9.8 |
| Tensile modulus, 50 mm/min | MPa | 2564 | 2565 | 2624 | 2625 |
| Tensile stress, break, 50 mm/min | MPa | 66.7 | 67.9 | 63.2 | 68.7 |
| Elongation at break | % | 76.5 | 80.7 | 62.4 | 75.1 |
| MVR 330° C./2.16 kg, 300 s | cc/10 min | 34.4 | 36.3 | 27.2 | 26.9 |
| YI after molding | | | | | |
| at 300° C./5 min, 1 mm | | 2.02 | 2.01 | 2.11 | 2.01 |
| at 360° C./5 min, 1 mm | | 2.83 | 2.42 | 3.22 | 3.08 |
| at 300° C./5 min, 3 mm | | 4.25 | 4.13 | 4.52 | 4.26 |
| at 360° C./5 min, 3 mm | | 6.43 | 5.35 | 7.58 | 7.17 |
| Total transmission, 1 mm | % | 90.8 | 90.8 | 90.7 | 90.7 |
| Haze, 1 mm | — | 0.52 | 0.21 | 0.32 | 0.51 |

Table 9 summarizes the properties of the blends of PPPBP-PC and ITR-PC. These compositions exemplify the ability to achieve a combination of high heat stability (Vicat softening temperature of 160° C. or higher), good processability (MVR at 330° C. and 2.16 kg of 25 cm$^3$/10 min or higher), good mechanical properties, and excellent color retention after abusive molding, heat ageing, and weathering. In addition, these examples show that including butyl tosylate in the compositions reduces the relative increase in YI observed under abusive molding conditions.

Set forth below are various Aspects of the disclosure.

Aspect 1. A thermoplastic composition comprising: a copolycarbonate comprising bisphenol A carbonate units and second carbonate units different from the bisphenol A carbonate units, wherein the second carbonate units are present in an amount of 10-50 mol %, preferably 20-45 mol %, more preferably 25-35 mol %, based on a sum of moles of bisphenol A carbonate units and second carbonate units; a poly(carbonate-arylate ester) copolymer comprising bisphenol A carbonate units and monoaryl arylate ester units, wherein the monoaryl arylate ester units are present in an amount of 5-50 mol %, preferably 10-30 mol %, based on the sum of moles of bisphenol A carbonate units and monoaryl arylate ester units; and optionally a bisphenol A homopolycarbonate; wherein the thermoplastic composition has: a Vicat B120 softening temperature of 155° C. or greater, as measured according to ISO 306; and a yellowness index of less than 10, preferably less than 8, more preferably less than 6, as measured according to ASTM D1925 on a plaque having a thickness of 3 mm and molded at a temperature of 360° C. for a residence time of 5 minutes; and an increase in yellowness index of less than 5, or of less than 4, after 600 hours of weathering in accordance with ISO 11341 on a molded plaque having a thickness of 1 mm.

Aspect 2. The composition of Aspect 1, wherein the thermoplastic composition comprises: 10-85 wt %, preferably 20-80 wt %, more preferably 30-70 wt % of the copolycarbonate; and 10-50 wt %, preferably 15-50 wt %, more preferably 15-45 wt % of the poly(carbonate-arylate ester) copolymer, each based on the total weight of the thermoplastic composition.

Aspect 3. The thermoplastic composition of any one or more of the preceding Aspects, wherein the second carbonate units are of formula (1) as defined herein.

Aspect 4. The thermoplastic composition of any one or more of the preceding Aspects, wherein the poly(carbonate-arylate ester) copolymer comprises monoaryl arylate ester units of formula (8) as defined herein.

Aspect 5. The thermoplastic composition of any one or more of the preceding Aspects, wherein the copolycarbonate further comprises at least 5 mol % of a third carbonate unit different from the bisphenol A carbonate units and the second carbonate units, the third carbonate unit comprising units of formulas (3) to (7) as defined herein.

Aspect 6. The thermoplastic composition of Aspect 5, wherein the copolycarbonate comprises 25-70 mol % of the bisphenol A carbonate units, 10-25 mol % of the second carbonate units, and 5-65 mol % of the third carbonate units, each based on the total number of carbonate units in the copolycarbonate; preferably wherein the copolycarbonate comprises 30 to 70 mol % of the bisphenol A carbonate units, 10 to 35 mol % of the second carbonate units, and 5 to 35 mol % of the third carbonate units, each based on the total number of carbonate units in the copolycarbonate.

Aspect 7. The thermoplastic composition of any one or more of the preceding Aspects, wherein the poly(carbonate-arylate ester) copolymer further comprises 1-20 mol % of resorcinol carbonate units of formula (10); or bisphenol ester units of formula (11); or a combination thereof, based on the total moles of units in the poly(carbonate-arylate ester) copolymer, wherein formulas (10) and (11) are as defined herein.

Aspect 8. The composition of any one or more of the preceding Aspects, further comprising 1 ppm to 20 ppm, preferably 2 ppm to 10 ppm of an acid stabilizer, the acid stabilizer comprising a Bronsted acid, a Lewis acid, an acid or an ester thereof containing a sulfur atom, or a combination thereof; preferably wherein the acid stabilizer comprises phosphoric acid, phosphorus acid, hypophosphorous acid, pyrophosphoric acid, polyphosphoric acid, an organosulfonic stabilizer of formula (12), as defined herein; more preferably wherein the acid stabilizer comprises phosphoric acid, phosphorus acid, butyl tosylate, p-toluene sulfonic acid, or a combination thereof.

Aspect 9. The thermoplastic composition of any one or more of the preceding Aspects, wherein the copolycarbonate comprises less than 2 ppm by weight of each of triethylamine, calcium, magnesium, potassium, iron, nickel, copper, zinc, lithium, sodium, ammonium, trimethylammonium, triethylammonium, chloride, bromide, fluoride, nitrite, nitrate, phosphite, phosphate, sulfate, formate, acetate, citrate, and oxalate, based on the weight of the copolycarbonate as measured by ion chromatography; and wherein the copolycarbonate, the optional bisphenol A homopolycarbonate, or both are derived from a bisphenol A having a bisphenol A purity of equal to or greater than 99.6%, or of equal to or greater than 99.7%, as measured by high performance liquid chromatography.

Aspect 10. The thermoplastic composition of any one or more of the preceding Aspects, wherein the thermoplastic composition has one or more of a haze of less than 1.5%, or less than 1.0%, or less than 0.75%, as measured according to ASTM D1003-00 on a molded plaque with a thickness of 1.0 mm; a total transmission of greater than 85%, or greater than 88% or greater than 90%, as measured according to ASTM D1003-00 on a molded plaque with a thickness of 1 mm; a melt volume flow rate greater than 20 cm$^3$/min, as measured at 330° C./2.16 Kg at 300 second dwell according to ISO 1133; a Vicat B120 softening temperature of 160° C. or higher, as measured according to ISO 306; an Izod notched impact energy of at least 10 kJ/m$^2$, as measured at 23° C. according to ISO 180/1A; a yellowness index of less than 20, preferably less than 10, more preferably less than 5, as measured according to ASTM D1925 on a plaque having a thickness of 1 mm and molded at a temperature of 355° C. for a residence time of 10 minutes; an increase in yellowness index of less than 8, preferably less than 5 after 1,600 hours of heat aging at 140° C., as measured according to ASTM D1925 on a molded plaque having a thickness of 1 mm; an increase in yellowness index of less than 20, more preferably less than 15 after 2,000 hours of heat aging at 155° C., as measured by ASTM D1925 on a molded plaque having a thickness of 1 mm; an increase in yellowness index of less than 5, more preferably less than 4 after 1,000 hours of weathering at 140° C., as measure according to ISO 11341 on a molded plaque having a thickness of 1 mm; or an increase in yellowness index of less than 8, more preferably less than 5 after 1,600 hours of weathering, as measure according to ISO 11341 on a molded plaque having a thickness of 1 mm.

Aspect 11. The thermoplastic composition of any one or more of the preceding Aspects, wherein the copolycarbonate has a hydroxyl end group content of less than 200 ppm and the optional bisphenol A homopolycarbonate has a hydroxyl end group content of less than 150 ppm; and wherein the optional bisphenol A homopolycarbonate has a sulfur content of less than 2 ppm, or the copolycarbonate, the optional bisphenol A homopolycarbonate, or both are derived from a bisphenol A having a sulfur content of less than 2 ppm, each as measured by a Total Sulfur Analysis based on combustion and coulometric detection.

Aspect 12. An article manufactured from the thermoplastic composition of any one or more of the preceding Aspects, preferably wherein the article is a component of a device comprising a lens, a device comprising a light guide, a device comprising a waveguide, a device comprising a collimator, a device comprising an optical fiber, a device comprising a lighting element, a device comprising a window, or a device comprising a door; or a structural component of a vehicle, a building, or an appliance; more preferably wherein the article is a component of a medical device, a component of a display screen, a component of an electronic device, a component of a safety device, a component of a screen, a component of a conveyor, a component of a mold, a component of a dish, a component of an enclosure, a component of a packaging, a component of a gas barrier, a lens for automotive lighting, a film or a layer of a multi-layer film, or a lighting cover; even more preferably wherein the article has no significant part distortion or discoloration when subjected to a secondary operation comprising over-molding, lead-free soldering, wave soldering, low temperature soldering, coating with a high-temperature cure, or a combination thereof.

Aspect 13. The article of Aspect 12, further comprising an indicium or a coating disposed on at least a portion of a surface of the article, preferably wherein the coating is a hard coat, a UV protective coat, an anti-refractive coat, an anti-reflective coat, a scratch resistant coat, or a combination thereof, or wherein at least a portion of a surface of the article is metallized.

Aspect 14. An optical lens manufactured from the thermoplastic composition of any one or more of Aspects 1-11, wherein the optical lens is a camera lens, a sensor lens, an illumination lens, a safety glass lens, an ophthalmic corrective lens, or an imaging lens; preferably wherein the optical lens is a table camera lens, a security camera lens, a mobile phone camera lens, a tablet camera lens, a laptop camera lens, a security camera lens, a camera sensor lens, a vehicle camera lens, a motion detector lens, a proximity sensor lens, a gesture control lens, an infrared sensor lens, an indoor lighting lens, an outdoor lighting lens, a vehicle headlamp lens, a vehicle foglight lens, a vehicle rearlight lens, a vehicle running light lens, a vehicle interior light lens, an a light emitting diode lens, an organic light emitting diode lens, an eyeglasses lens, a goggles lens, a visor, a helmet lens, a monocle lens, a corrective glasses lens, a contact lens, a scanner lens, a projector lens, a magnifying glass lens, a microscope lens, a telescope lens, a security lens, or a reading glasses lens; even more preferably wherein the optical lens further comprises an indicia or a coating disposed on at least a portion of one or both surfaces of the optical lens, preferably wherein the coating is a hard coat, a UV protective coat, an anti-refractive coat, an anti-reflective coat, a scratch resistant coat, or a combination thereof, or wherein at least a portion of a surface of the optical lens is metallized.

Aspect 15. The optical lens of Aspect 14, further comprising a macrotexture, a microtexture, a nanotexture, or a combination thereof on a surface of the lens.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles. The singular forms "a," "an," and "the" include plural referents unless the context clearly dictates otherwise. "Or" means "and/or" unless clearly indicated otherwise by context. A "combination" is inclusive of blends, mixtures, alloys, reaction products, and the like. "Combination thereof" is open to one or more of the listed elements, optionally with an equivalent element not listed.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

As used herein, the term "hydrocarbyl" and "hydrocarbon" refers broadly to a substituent or group comprising carbon and hydrogen, optionally with 1-3 heteroatoms, for example, O, N, halogen, Si, S, or a combination thereof "alkyl" means a straight or branched chain, saturated monovalent hydrocarbon group; "alkylene" means a straight or branched chain, saturated, divalent hydrocarbon group; "alkylidene" means a straight or branched chain, saturated divalent hydrocarbon group, with both valences on a single common carbon atom; "alkenyl" means a straight or branched chain monovalent hydrocarbon group having at least two carbons joined by a carbon-carbon double bond; "cycloalkyl" means a non-aromatic monovalent monocyclic or multicyclic hydrocarbon group having at least three carbon atoms, "cycloalkenyl" means a non-aromatic cyclic divalent hydrocarbon group having at least three carbon atoms, with at least one degree of unsaturation; "aryl" means an aromatic monovalent group containing only carbon in the aromatic ring or rings; "arylene" means an aromatic divalent group containing only carbon in the aromatic ring or rings; "alkylaryl" means an aryl group that has been substituted with an alkyl group as defined above, with 4-methylphenyl being an exemplary alkylaryl group; "arylalkyl" means an alkyl group that has been substituted with an aryl group as defined above, with benzyl being an exemplary arylalkyl group; "acyl" means an alkyl group as defined above with the indicated number of carbon atoms attached through a carbonyl carbon bridge (—C(=O)—); "alkoxy" means an alkyl group as defined above with the indicated number of carbon atoms attached through an oxygen bridge (—O—); and "aryloxy" means an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. Combinations of substituents or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as acyl); carboxamido; $C_{1-6}$ or $C_{1-3}$ alkyl, cycloalkyl, alkenyl, and alkynyl; $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkyl sulfonyl; aminodi ($C_{1-6}$ or $C_{1-3}$)alkyl; $C_{6-12}$ aryl having at least one aromatic ring; $C_{7-19}$ arylalkyl having 1-3 separate or fused rings and from 6-18 ring carbon atoms; or arylalkoxy having 1-3 separate or fused rings and from 6-18 ring carbon atoms.

Unless defined otherwise, technical and scientific terms used herein have the same meaning as is commonly understood by one of skill in the art to which this disclosure belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference. All ASTM tests are based on the 2003 edition of the Annual Book of ASTM Standards unless otherwise indicated. All ISO standards are based on the year 2004 unless otherwise indicated.

While exemplary aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising:
    a copolycarbonate comprising bisphenol A carbonate units and second carbonate units different from the bisphenol A carbonate units, wherein the second carbonate units are present in an amount of 10-50 mol %, based on a sum of moles of bisphenol A carbonate units and second carbonate units;
    a poly(carbonate-arylate ester) copolymer comprising bisphenol A carbonate units and monoaryl arylate ester units, wherein the monoaryl arylate ester units are present in an amount of 5-50 mol %, based on the sum of moles of bisphenol A carbonate units and monoaryl arylate ester units; and
    optionally a bisphenol A homopolycarbonate;
    wherein the thermoplastic composition has one or more of:
        a Vicat B120 softening temperature of 155° C. or greater, as measured according to ISO 306; and
        a yellowness index of less than 10, as measured according to ASTM D1925 on a plaque having a thickness of 3 mm and molded at a temperature of 360° C. for a residence time of 5 minutes; and
        an increase in yellowness index of less than 5, after 600 hours of weathering in accordance with ISO 11341 on a molded plaque having a thickness of 1 mm.

2. The composition of claim 1, wherein the thermoplastic composition comprises:
   10-85 wt % of the copolycarbonate; and
   10-50 wt % of the poly(carbonate-arylate ester) copolymer,
   each based on the total weight of the thermoplastic composition.

3. The thermoplastic composition of claim 1, wherein the second carbonate units are of formula (1):

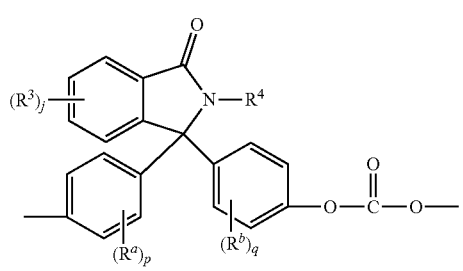

(1)

wherein
   each occurrence of $R^a$ and $R^b$ is independently a $C_{1-12}$ alkyl, a $C_{1-12}$ alkenyl, a $C_{3-8}$ cycloalkyl, or a $C_{1-12}$ alkoxy,
   each occurrence of $R^3$ is independently a halogen atom or a $C_{1-6}$ alkyl,
   $R^4$ is a hydrogen or a $C_{1-25}$ hydrocarbyl, and
   p, q, and j are each independently 0-4.

4. The thermoplastic composition of claim 1, wherein the poly(carbonate-arylate ester) copolymer comprises monoaryl arylate ester units of formula (8):

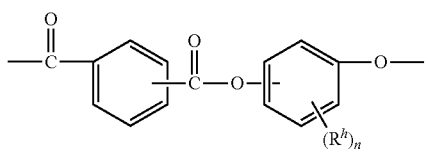

(8)

wherein each occurrence of $R^h$ is independently a halogen atom or a $C_{1-10}$ hydrocarbyl, and n is 0-4.

5. The thermoplastic composition of claim 1, wherein the copolycarbonate further comprises at least 5 mol % of a third carbonate unit different from the bisphenol A carbonate units and the second carbonate units, wherein the third carbonate unit is of formulas (3) to (7):

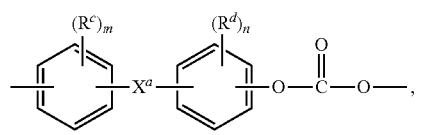

(3)

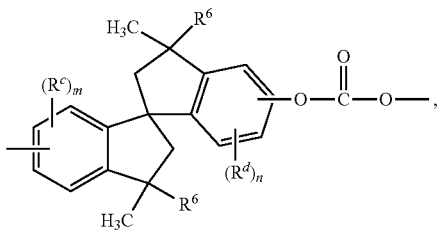

(4)

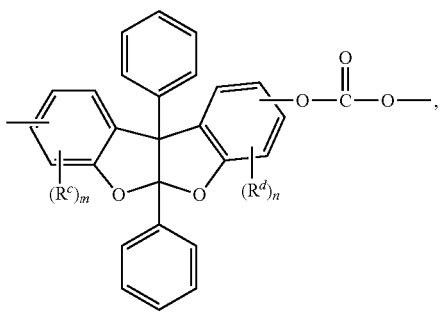

(5)

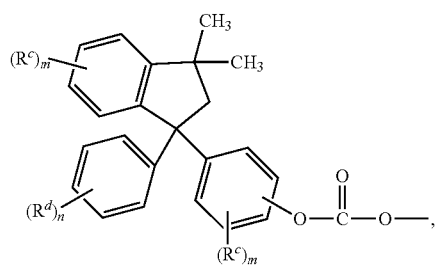

(6)

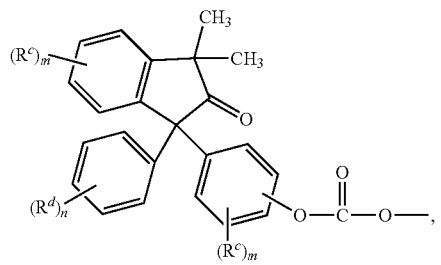

(7)

or a combination thereof, wherein
   each occurrence of $R^c$ and $R^d$ is independently a $C_{1-12}$ alkyl, a $C_{1-12}$ alkenyl, a $C_{3-8}$ cycloalkyl, or a $C_{1-12}$ alkoxy;
   each $R^6$ is independently a $C_{1-3}$ alkyl or a phenyl;
   $X^a$ is a $C_{6-12}$ polycyclic arylene, a $C_{3-18}$ mono- or polycycloalkylene, a $C_{3-18}$ mono- or polycycloalkylidene, a group of the formula $-(Q^1)_x-G-(Q^2)_y-$ wherein $Q^1$ and $Q^2$ are each independently a $C_{1-3}$ alkylene, G is a $C_{3-10}$ cycloalkylene, x is 0 or 1, and y is 1, or a group of formula $—C(Z^1)(Z^2)—$ wherein $Z^1$ is a $C_{1-12}$ alkyl and $Z^2$ is $C_{6-12}$ aryl, and
   m and n are each independently 0-4.

6. The thermoplastic composition of claim 5, wherein the copolycarbonate comprises 25-70 mol % of the bisphenol A carbonate units, 10-35 mol % of the second carbonate units, and 5-65 mol % of the third carbonate units, each based on the total number of carbonate units in the copolycarbonate.

7. The thermoplastic composition of claim 1, wherein the poly(carbonate-arylate ester) copolymer further comprises 1-20 mol % of
resorcinol carbonate units of formula (10):

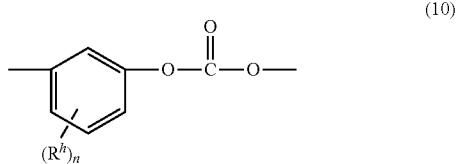

wherein each $R^h$ is independently a $C_{1-10}$ hydrocarbon group and n is 0-4; or
bisphenol ester units of formula (11):

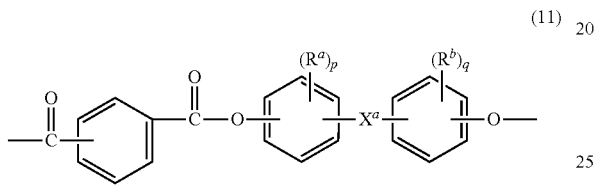

wherein $R^a$ and $R^b$ are each independently a $C_{1-12}$ alkyl, p and q are each independently integers of 0-4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group; or
a combination thereof, based on the total moles of units in the poly(carbonate-arylate ester) copolymer.

8. The thermoplastic composition of claim 1, further comprising 1 ppm to 20 ppm of an acid stabilizer, wherein the acid stabilizer is a Bronsted acid, a Lewis acid, an acid or an ester thereof containing a sulfur atom, or a combination thereof.

9. The thermoplastic composition of claim 1,
wherein the copolycarbonate comprises less than 2 ppm by weight of each of triethylamine, calcium, magnesium, potassium, iron, nickel, copper, zinc, lithium, sodium, ammonium, trimethylammonium, triethylammonium, chloride, bromide, fluoride, nitrite, nitrate, phosphite, phosphate, sulfate, formate, acetate, citrate, and oxalate, based on the weight of the copolycarbonate as measured by ion chromatography; and
wherein the copolycarbonate, the optional bisphenol A homopolycarbonate, or both are derived from a bisphenol A having a bisphenol A purity of equal to or greater than 99.6 wt %, as measured by high performance liquid chromatography.

10. The thermoplastic composition of claim 1, wherein the thermoplastic composition has one or more of
a haze of less than 1.5%, as measured according to ASTM D1003-00 on a molded plaque with a thickness of 1.0 mm;
a total transmission of greater than 85%, as measured according to ASTM D1003-00 on a molded plaque with a thickness of 1 mm;
a melt volume flow rate greater than 20 cm³/min, as measured at 330° C./2.16 Kg at 300 second dwell according to ISO 1133;
a Vicat B120 softening temperature of 160° C. or higher, as measured according to ISO 306;
an Izod notched impact energy of at least 10 kJ/m², as measured at 23° C. according to ISO 180/1A;
a yellowness index of less than 20, as measured according to ASTM D1925 on a plaque having a thickness of 1 mm and molded at a temperature of 355° C. for a residence time of 10 minutes;
an increase in yellowness index of less than 8, after 1,600 hours of heat aging at 140° C., as measured according to ASTM D1925 on a molded plaque having a thickness of 1 mm;
an increase in yellowness index of less than 20, after 2,000 hours of heat aging at 155° C., as measured by ASTM D1925 on a molded plaque having a thickness of 1 mm;
an increase in yellowness index of less than 5, after 1,000 hours of weathering at 140° C., as measure according to ISO 11341 on a molded plaque having a thickness of 1 mm; or
an increase in yellowness index of less than 8, after 1,600 hours of weathering, as measure according to ISO 11341 on a molded plaque having a thickness of 1 mm.

11. The thermoplastic composition of claim 1,
wherein the copolycarbonate has a hydroxyl end group content of less than 200 ppm and the optional bisphenol A homopolycarbonate has a hydroxyl end group content of less than 150 ppm; and
wherein the optional bisphenol A homopolycarbonate has a sulfur content of less than 2 ppm, or the copolycarbonate, the optional bisphenol A homopolycarbonate, or both are derived from a bisphenol A having a sulfur content of less than 2 ppm, each as measured by a Total Sulfur Analysis based on combustion and coulometric detection.

12. An article manufactured from the thermoplastic composition of claim 1.

13. The article of claim 12, further comprising an indicium or a coating disposed on at least a portion of a surface of the article.

14. The article of claim 12, wherein the article is an optical lens, wherein the optical lens is a camera lens, a sensor lens, an illumination lens, a safety glass lens, an ophthalmic corrective lens, or an imaging lens.

15. The article of claim 14, further comprising a macrotexture, a microtexture, a nanotexture, or a combination thereof on a surface of the lens.

16. The article of claim 14, further comprising an indicium or a coating disposed on at least a portion of one or both surfaces of the lens.

17. The article of claim 16, wherein the coating is a hard coat, a UV protective coat, an anti-refractive coat, an anti-reflective coat, a scratch resistant coat, or a combination thereof, or wherein at least a portion of a surface of the optical lens is metallized.

18. The thermoplastic composition of claim 1, further comprising 1 to 20 ppm of an acid stabilizer, wherein the acid stabilizer is phosphoric acid, phosphorus acid, hypophosphorous acid, pyrophosphoric acid, polyphosphoric acid, an organosulfonic stabilizer of formula (12):

wherein $R^7$ is a $C_{1-30}$ alkyl, a $C_{6-30}$ aryl, a $C_{7-30}$ alkylarylene, or a $C_{7-30}$ arylalkylene, and $R^8$ is a $C_{1-30}$ alkyl or a group of the formula —S(=O)$_2$—$R^7$; or $R^7$ is a polymer unit derived from a $C_{2-32}$ ethylenically unsaturated aromatic sulfonic acid or its ester, and $R^8$ is hydrogen; or a combination thereof.

19. The thermoplastic composition of claim 1, comprising 20-80 wt % of the copolycarbonate, wherein the second carbonate units are present in the amount of 20-45 mol %, based on the sum of moles of bisphenol A carbonate units and second carbonate units, and 15-50 wt % of the poly(carbonate-arylate ester) copolymer, wherein the monoaryl arylate ester units are present in the amount of 10-30 mol %, based on the sum of moles of bisphenol A carbonate units and monoaryl arylate ester units.

20. The thermoplastic composition of claim 1, comprising 30-70 wt % of the copolycarbonate, wherein the second carbonate units are present in the amount of 25-35 mol %, based on the sum of moles of bisphenol A carbonate units and second carbonate units, and 15-45 wt % of the poly(carbonate-arylate ester) copolymer, wherein the monoaryl arylate ester units are present in the amount of 10-30 mol %, based on the sum of moles of bisphenol A carbonate units and monoaryl arylate ester units.

\* \* \* \* \*